UNITED STATES PATENT OFFICE 2,128,083

WAX ACID SOAP AND PROCESS OF MAKING SAME

Carleton Ellis, Montclair, N. J., assignor to Standard Oil Development Company, a corporation of Delaware No Drawing. Application September 7, 1935, Serial No. 39,527

6 Claims. (Cl. 87—16)

This invention relates to the preparation of soaps and particularly to soap compositions derived from petroleum products.

In the manufacture of soap, vegetable or animal oils, tallow, or other soap stock are heated with an aqueous solution of alkali, e. g. the hydroxide or carbonate of sodium or potassium, until complete reaction with the fatty material has taken place. This reaction between soap stock and alkali results in the formation of soap, the alkali salts of fatty acids, and of glycerine. Soap is separated from the aqueous solution of glycerin by a salting-out operation, which consists in the addition of dry salt (sodium chloride) or of a saturated aqueous solution of salt. Soap as obtained in this manner may be subjected to several salting-out, or graining, steps by redissolving in water and adding salt. It is subjected also to subsequent operations such as crutching, milling, slabbing, cutting, and so forth, to give a finished product.

In my invention I prefer to use as soap stock the wax acids produced by oxidation of various waxes, generally of petroleum origin, such as paraffin wax, Montan wax, Palembang wax, slop wax, petrolatum and so forth. Oxidation is effected usually by heating wax at a temperature corresponding to its melting point, or higher, with oxidizing agents such as air, oxygen, ozone, oxides of nitrogen, strong nitric acid, and the like. Reaction may be carried out under atmospheric or superatmospheric pressures, or even under pressures less than atmospheric. Catalysts, for example, previously oxidized wax, barium cinnamate, zinc stearate, or manganese naphthenate or acetylacetonate, may be employed, if desired.

I have found that the alkali soaps, particularly the sodium and potassium soaps, of such wax acids although they are salted from aqueous solutions by the addition of common salt (sodium chloride) nevertheless remain dissolved when large proportions of certain other salts, such as potassium iodide, or potassium or sodium citrate, are added to the aqueous soap solution. On the other hand, such salts readily grain, or salt-out, the usual types of soap such as sodium stearate, oleate, or linoleate. As a general rule those salts of sodium or potassium which crystallize from water with several molecules of water of crystallization, which exhibit a high degree of solubility in water at low temperatures, e. g., 0° to 20° C., and whose solubility in water increases rapidly with rises in temperature, are particularly adaptable for my purpose. An example of a salt which is especially suitable is crystalline sodium thiosulphate pentahydrate, whose formula can be represented as $Na_2S_2O_3 \cdot 5H_2O$.

As a by-product in petroleum refining, sodium thiosulphate is obtained readily by oxidizing spent lyes from washing petroleum distillates or scrubbing gaseous hydrocarbon gases, particularly those distillates or gases resulting from the distillation or cracking of high-sulphur crude petroleum oils. Such distillates or gases usually contain a considerable proportion of hydrogen sulphide, which is converted largely to sodium hydrosulphide when a caustic soda solution is employed as the washing or scrubbing agent. On air-blowing these spent alkaline solutions the sodium hydrosulphide is oxidized to sodium thiosulphate, probably according to the reaction

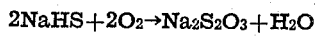

$$2NaHS + 2O_2 \rightarrow Na_2S_2O_3 + H_2O$$

Distillates, e. g., gasoline or kerosene, from high-sulphur crude petroleum oils not only contain dissolved hydrogen sulphide but also, in many instances, dissolved elemental sulphur. Although caustic soda is converted largely to sodium hydrosulphide in spent lyes, nevertheless some sodium sulphide ($Na_2S$) is also formed. During the washing operation the latter compound may extract some elemental sulphur from the distillates thus forming water-soluble polysulphides of the type $Na_2S_2$. On air-blowing spent lyes these polysulphides are oxidized also to thiosulphates, possibly according to the reaction

$$2Na_2S_2 + 3O_2 \rightarrow 2Na_2S_2O_3$$

Crude sodium thiosulphate made by the above described operations can be purified by concentrating the oxidized spent alkaline solutions to an appropriate degree by heating and then allowing them to cool. Crystalline sodium thiosulphate pentahydrate so obtained, after removal of the mother-liquor, is generally about 95 per cent pure. If desired, a product of a higher degree of purity, 98 per cent or better, is procured by a second recrystallization from water.

Air-oxidized spent alkaline solutions may contain, in addition to sodium thiosulphate, varying small proportions of sodium salts of other oxygen- and sulphur-containing acids, e. g., sodium sulphite or sulphate, or sodium tetrathionate, as well as sodium carbonate due to absorption of carbon dioxide from the air by the alkaline solution. The first two salts (sulphite and sulphate) may be derived by oxidation of sodium sulphide and the latter (tetrathionate) by oxidation of sodium thiosulphate during air-blowing of the spent alkali. The terms "thiosulphate" or "sodium thiosulphate", therefore, embrace not only the chemically pure compound whose formula is $Na_2S_2O_3.5H_2O$, but also petroleum-derived sodium thiosulphate containing minor proportions of sodium salts of other oxygen- and sulphur-containing acids.

Furthermore, the terms "spent alkali" or "spent alkaline solutions" as employed herein refer particularly to those alkaline solutions containing dissolved hydrogen sulphide. The spent alkalies obtained from washing acid-treated distillates and which contain mainly dissolved sodium sulphite or sulphate, or sodium sulphonates, may be employed also, provided they contain sufficient uncombined alkali and the proportion of sulphites and/or sulphates is not great enough to exert deleterious effects on the soap composition.

In addition to exhibiting the unexpected property of not salting-out, wax-acid soaps from hot concentrated aqueous solutions, sodium thiosulphate also shows other unusual and novel properties. On incorporating a substantial proportion of thiosulphate with such soap solutions and allowing the homogeneous mass to cool, a stiff, transparent gel-like composition results. The degree of stiffness, or rigidity, as well as the degree of transparency, may be varied between wide limits by changing the proportion of thiosulphate incorporated. Also the detergent and lathering properties of the soaps are not impaired by addition of thiosulphate.

It has been suggested that sodium thiosulphate be added, in the proportion of 0.1 per cent or thereabouts, to ordinary fatty acid soaps to decrease or inhibit the rate of oxidation of such soaps. Wax-acid soaps, which permit incorporation of much larger proportions of thiosulphate, should be expected, therefore, to remain immune from deteriorating influences such as oxidation for a practically indefinite period of time.

One method whereby I may prepare soap compositions according to my invention is as follows: Wax-acids are carefully neutralized by the addition of a concentrated solution of sodium hydroxide, for example, a 30 per cent aqueous solution. If necessary the mass can be heated to secure intimate mixing of the materials and complete reaction. The neutral soap is added to twice its weight of water and solution effected by heating. While the mixture is hot, crystalline sodium thiosulphate (pentahydrate) equal in weight to that of the soap is incorporated. The hot homogeneous mass is allowed to cool, whereby a transparent, semi-solid gel-like product is obtained, which differs greatly in appearance from the opaque precipitate obtained when ordinary fatty acid soap is treated similarly.

As previously mentioned, crystalline sodium thiosulphate may be obtained by oxidizing and concentrating spent lyes from washing petroleum distillates or gaseous hydrocarbons containing hydrogen sulphide. Such spent lyes, after the oxidation step often contain a considerable proportion of free alkali. In some instances it may be desirable to utilize this alkali in the preparation of soaps. A second method, therefore, for making a soap product consists of the following steps: The spent alkali, after oxidation with air, is concentrated until its gravity becomes about 35° to 38° A. P. I. At this concentration all of the alkali and thiosulphate remain in solution. The concentrated oxidized spent lye is carefully added to wax-acids, the quantity of the latter being just sufficient to neutralize the free alkali. In this manner a soft pasty soap composition is secured. Gelatinization of the latter may be effected by melting and digesting followed by cooling. In some cases it may be preferable not to concentrate the oxidized spent lye but instead add alkali to it. This alkali-fortified liquor can then be incorporated with wax-acids to give soap products as described. At other times it may be desirable to prepare thiosulphate soaps from concentrated oxidized spent alkali and incorporate these with soaps resulting from the interaction of wax acids and concentrated aqueous caustic soda. Other variations in the steps whereby oxidized spent alkali is incorporated in soaps of petroleum origin are possible.

As pointed out above, the gel-firmness of the soap compositions may be varied according to the proportion of thiosulphate employed. The same effect is brought about by modifying the proportion of water used, less firm compositions being obtained with increasing proportions of water. Modifying agents, such as the sodium salts of acid sludge sulphonic acids, may be added to the soap products to decrease their firmness. Sulphonic acids (compounds having one or more $SO_3H$ groups in their molecular structure) as well as their alkali or alkaline earth salts are characterized generally by their high solubility in water. These salts are usually hygroscopic in nature and often crystallize from water with one or more molecules of water of crystallization. Salts of this type are particularly suitable as modifying agents for my soap products. For example, a few per cent of the sodium salts of oil and/or water soluble sulphonic acids derived from acid sludge from the refining of white (medicinal) oils can be incorporated with the hot or molten soap compositions containing sodium thiosulphate to yield a less firm product on cooling. In some instances for certain industrial uses it may be desirable to substitute sodium thiosulphate entirely by alkali sludge sulphonates.

Other modifying agents which I may incorporate with my soap compositions are polyhydric alcohols (e. g. glycerol), sugars (such as glucose, laevulose, cane sugar, or corn syrup), and polyhydric ethers (as for example, polyglycol or polyglycerol). Addition of such bodies in proper proportion serves two purposes: (1) they render the soap more transparent and softer in nature, and (2) decrease or inhibit efflorescence or formation of saline incrustations during periods of storage or exposure of the soaps to the atmosphere. Bodies of this character are termed efflorescence inhibitors, minimizers or allayers. Glycerol and glucose are useful for the purpose, as indicated, having the advantage of being readily available and reasonably cheap. Glucose in its various forms may be employed to advantage, exposure tests over long periods having indicated that efflorescence may be definitely inhibited or at least greatly minimized by the presence of only a small proportion of glucose.

Still other substances which may be added, if desired, are fillers and abrasives (e. g., pumice or kieselguhr), dyes or pigments (for example, ultramarine), and perfumes (such as oil of mirbane, oil of lavender, or pine oil).

Harder or softer soaps may be obtained in other ways also. For example, the mixed wax-acids can be distilled under pressures less than atmospheric and several fractions collected separately. Softer soaps are secured by saponification of the lower-boiling fractions with alkalies, and harder soaps from the higher-boiling fractions. Thus by employing either one fraction of distilled wax-acids, mixtures of two or more fractions in varying proportions soaps may be produced whose degree of hardness vary between wide limits. Partial separation may be effected also by chilling the mixed acids to a temperature at which a portion of them become solid, and removing the liquid portion by pressing. Still another procedure consists in saponifying the mixed acids with, for example, concentrated aqueous sodium hydroxide, heating the mixture until molten, and then adding concentrated brine (sodium chloride) solution. The less soluble soaps, or those derived from the higher molecular weight acids, are salted from solution and these may be withdrawn. Fractionation of soaps in this manner is regulated to a greater or lesser degree by the proportion of concentrated brine employed. Soaps prepared by any of these fractionating operations may be gelatinized to a transparent soap composition by incorporation of thiosulphate.

While the use of oxidized spent alkali in the preparation of soap compositions forms one phase of my invention, still another phase consists in employing spent alkaline solutions without subjecting them to oxidation. Spent alkali is added to a sufficient quantity of wax-acids to obtain an apparent neutral soap product. Excess wax-acids may be added then to the mixture, and the mass heated to eliminate hydrogen sulphide or other corrosive sulphur compounds. In some instances it may be desirable to further deodorize the soap composition. This can be accomplished by passing steam or air through the hot molten mass at atmospheric pressure or in vacuo for a short period of time. The resulting product may be used as such or it may be gelatinized by addition of thiosulphate as previously described.

Alkali soaps of wax-acids, particularly the potassium soap, may be considered as unique in that although they give viscous or semi-solid soap compositions at room temperature, or above, having water contents corresponding to those of middle soaps for ordinary fatty acid soaps, nevertheless, such wax-acid soap compositions apparently do not exhibit the properties of middle soap. If, therefore, wax-acid soap does form a middle soap it is probably over a narrow or inconsequential range of concentrations of soap. Middle soap (from fatty acid soaps) is ordinarily characterized by being anisotropic, generally containing about 40 to 60 per cent of water, and in physical appearance being an extremely sticky, gummy mass which does not flow even when hot and very slowly dissolves in water. Middle soap is produced occasionally during saponification of the usual types of soap stock employed in soapmaking and its presence is a disturbing factor in the manufacture of soap. On saponifying wax acids with sufficient potassium hydroxide solution, for example, to yield a soap containing 40 per cent water, it was found that the product, although anisotropic, did not resemble middle soap in its other properties. Furthermore, continual additions of small proportions of water to the wax-acid product yielded soaps which became less viscous and finally failed to exhibit the property of anisotropy. The preparation of wax-acid soaps having a water content within the range of middle soap but substantially devoid of the characteristics of middle soap also constitutes a part of my invention.

The following examples will serve as illustrations. Unless otherwise stated, all parts are by weight.

*Example 1.*—Wax-acid soap is made by carefully neutralizing the mixed acids with 30 per cent aqueous sodium hydroxide. Twenty parts of this wax-acid soap are mixed with 20 parts of water, and the mixture heated until complete solution occurs. To the hot solution are added slowly (with constant stirring) 10 parts of crystalline sodium thiosulphate. The homogeneous mass is allowed to cool, whereby a solid transparent soap composition is obtained.

*Example 2.*—A softer composition is made by the procedure given in Example 1 when 30 parts of water are employed.

Soaps as prepared according to the above examples were employed in washing one's hands, cleaning glassware, and other articles.

*Example 3.*—A soap which is particularly applicable for cleaning automobiles is made by incorporating 5 parts of wax-acid soaps, as prepared in Example 1, with 17 parts of water and 10 parts of sodium thiosulphate. This product, mixed with sufficient water to give a thick, soapy, readily-lathering solution, removed grease and dirt when applied to the wheels, fenders, fuel tank, and other parts of a bespattered automobile which had been in continuous use for several weeks.

*Example 4.*—Spent alkali was oxidized by air-blowing until substantially all of the sodium hydrosulphide was converted mainly to salts of the sodium thiosulphate type. The oxidized spent alkali was concentrated until its specific gravity became 1.295.

A thiosulphate soap composition was made by neutralizing 187 parts of wax-acids with 900 parts of concentrated oxidized spent alkali. This was a soft, pasty mass which possessed detergent properties.

*Example 5.*—A thicker, more viscous soap paste was obtained by further concentrating the oxidized spent alkali, described in Example 4, until its specific gravity was 1.417, and neutralizing 54 parts of wax-acids with 176 parts of concentrated, oxidized spent alkali.

*Example 6.*—The soap paste, prepared according to Example 4, was gelatinized by heating until a clear homogeneous solution was obtained and then allowing the solution to cool.

*Example 7.*—A soap paste exerting a mild abrasive action in addition to its detergent properties was produced by incorporating 25 per cent by weight of powdered pumice with the soap described in Example 4.

*Example 8.*—A perfumed soap was made by incorporating 10 parts of wax-acid soaps, 34 parts of water, and 20 parts of sodium thiosulphate, as described in Example 1, and adding 0.01 per cent by weight of pine oil before allowing the mass to cool and gelatinize.

*Example 9.*—Sodium wax-acid soap, as prepared in Example 1, was heated to 100° C. to render it semi-fluid and while maintaining the soap at this temperature an equal volume of hot saturated solution of sodium chloride was added. The nigre, or aqueous layer, was withdrawn as a hot liquid. This extraction operation was repeated twice. The precipitated wax-acid soaps were obtained as a very light-colored, solid material. These could be gelatinized by incorporating with water and thiosulphate as described in Example 1.

*Example 10.*—The combined aqueous layers, or nigre, from Example 9, became a solid gel on cooling to room temperature. This was dissolved in hot water, acidified with dilute hydrochloric acid, and cooled to 8° C. At that temperature the liberated wax acids were solid and easily separated from the aqueous layer. Saponification of these acids with 30 per cent aqueous caustic soda yields a soft soap. Gelatinization was effected by heating 5 parts of the soap with 10 parts of oxidized spent alkali (specific gravity 1.295) and cooling.

*Example 11.*—The effect of thiosulphate on the sudsing power was shown in the following manner: Equal weight of thiosulphate soap-gel and of a commercial grade of toilet soap were placed in separate containers of the same shape, and the same volume of water added to each. After shaking both containers for the same period of time it was noted that suds from the thiosulphate soap had risen to a greater height. Furthermore, on allowing the containers to stand it was found that suds remained for several hours (often as much as 24 hours) longer above the solution of thiosulphate soap than above the ordinary soap solution.

*Example 12.*—The modifying action of sludge sulphonates on wax-acid soaps was determined as follows: 1 part of wax-acid soap, as prepared in Example 1, was dissolved in 1.5 parts of water by heating and then allowed to cool and solidify. Another batch was prepared in the same manner except that 0.4 part of sodium sludge sulphonates was incorporated in the molten mass. After 24 hours the penetrability of each soap composition was determined by placing a weighted rod on the surface of the sample, slowly heating the mixture, and noting the temperature at which the rod sank into the composition. A temperature of 42° C. was required in the case of the first soap composition, while a temperature of only 22.5° C. was necessary for the second sample, which contained acid sludge sulphonates.

*Example 13.*—A colored thiosulphate soap composition is obtained by incorporating 0.1 per cent by weight of ultramarine with the soap paste described in Example 4.

*Example 14.*—Wax-acid soap is prepared as in Example 1. 5 parts of this soap are dissolved in 10 parts of water, and 17 parts of sodium thiosulphate and 8 parts of glycerol are incorporated with the hot solution. On cooling the hot homogeneous mass a clear transparent soap gel is obtained. This sample remained exposed to air for several months without exhibiting efflorescence.

*Example 15.*—Proceed as in Example 14, except 6.7 parts of commercial glucose syrup, specific gravity about 1.5, are substituted for glycerol. Such a sample remained exposed to the atmosphere for an indefinite time without exhibiting efflorescence.

Preferably glucose is used as an efflorescence inhibitor or depressant and preferably also the proportion of thiosulphate is less than that of the soap; that is, the soap is the major component. Glucose or other depressant may be reduced as the percentage of thiosulphate present is lowered. Thus

*Example 16.*—Incorporate wax-acid soap 5, water 5, thiosulphate 3, and glucose 0.5 part. The cake of soap obtained is transparent to translucent, of a light brown color and after several months exposure to the air at room temperature exhibits a very slight efflorescence.

*Example 17.*—Using 5 parts of the same type of wax-acid soap, a similar amount of water, 1 part of thiosulphate and 1.7 parts of glucose, the soap cake is clear and without efflorescence even after many months exposure to the air.

In general, I prefer a ratio of soap, thiosulphate and glucose of 100:50:10, but the range of glucose (or equivalent quantities of other depressants) to soap and thiosulphate may vary considerably, according to a variety of conditions.

By glucose I designate a heavy bodied commercial product concentrated almost to a solid and containing perhaps 10 to 15 per cent of water. It is, of course, possible to use glucose in other forms and concentrations.

*Example 18.*—To 7 parts of mixed wax-acids were added 7 parts of sodium hydrosulphide solution obtained by scrubbing cracking gas with caustic soda solution. After incorporation the mass was heated to 100° C. A soap composition was obtained which exhibited good detergent properties but which stained copper and some other metals badly.

*Example 19.*—To 14 parts of the soap composition prepared in Example 18 were added 2 parts of mixed wax-acids and the mixture heated to 100° C. By this treatment all corrosive compounds were eliminated. Excess wax-acids were saponified with 30 per cent aqueous caustic soda. The resulting soap composition was neutral, non-corrosive, and exhibited excellent detergent properties.

*Example 20.*—Potassium soaps (containing different proportions of water) were made by interacting potassium hydroxide solutions of various concentrations with mixed wax acids. The compositions and appearances of the products, both when hot and after cooling and standing for 24 hours, are tabulated below:

| Sample | Percent soap | Percent water | Appearance when cold | Appearance when cold after 24 hours |
| --- | --- | --- | --- | --- |
| 1 | 60.4 | 39.6 | Clear gel, anisotropic | Clear gel, anisotropic. |
| 2 | 56.2 | 43.5 | Clear gel, anisotropic | Curd soap precipitated. Some anisotropy. |
| 3 | 53.2 | 46.8 | Liquid. Slightly anisotropic. | Liquid. Isotropic. |
| 4 | 48.5 | 51.4 | Liquid. Slightly anisotropic. | Liquid. Isotropic. |
| 5 | 41.5 | 58.5 | Liquid. Isotropic | Liquid. Isotropic. |

Although samples 3, 4 and 5 were somewhat viscous liquids when cold, yet the viscosity decreased with increasing proportions of water. In no case was the formation of a sticky, gummy, non-flowable, poorly-soluble soap composition observed, thus suggesting the absence of any substantial proportion of middle soap.

From the foregoing it will be seen that my invention consists in the preparation of soap compositions from petroleum-derived materials. The soap stock, or organic component, being mixed wax-acids from the oxidation of paraffin wax and the like, while the inorganic component is spent alkali from the washing of petroleum distillates and similar sources. One phase of my invention contemplates directly reacting these two components to furnish a neutral, non-corrosive detergent. Another phase involves incorporation of sodium thiosulphate or saline material of the sodium thiosulphate type obtained by oxidation of spent alkali. Incorporation may comprise, for instance, either direct interaction of wax-acids with oxidized spent alkali, before or after concentrating the latter, or concentrating oxidized spent alkali and obtaining therefrom the saline material by crystallization and adding the crystallized material to wax-acid soaps to form transparent soap gels. Efflorescence or saline incrustation on exposure of such gels to air may be decreased or inhibited by the use of polyhydric alcohols or a sugar such as glucose. Still another aspect of my invention includes the preparation of alkali soap compositions which contain the same proportions of water within the range of middle soaps as derived from vegetable oil fatty acids but are substantially devoid of the characteristics of middle soap.

What I claim is:

1. Process for making a transparent, petroleum-derived, water-soluble soap gel which comprises oxidizing spent alkaline solutions of hydrogen sulphide of petroleum origin, concentrating the oxidized spent alkali, incorporating a sufficient proportion of wax acids to react with uncombined alkali, and heating to complete the saponification and induce transparency.

2. Process for making a transparent, petroleum-derived, water-soluble soap gel which comprises oxidizing spent alkaline solutions of hydrogen sulphide of petroleum origin, concentrating the oxidized spent alkali, incorporating a sufficient proportion of wax acids to react with uncombined alkali, incorporating a substantial proportion of an efflorescence-inhibitor, and heating further.

3. Process for making a transparent, petroleum-derived, water-soluble soap gel which comprises incorporating water-soluble alkali soaps of wax acids with saline material derived from oxidized spent alkaline solutions of hydrogen sulphide of petroleum origin, incorporating a substantial proportion of an efflorescence-inhibitor, and heating to induce transparency.

4. A gel soap comprising the saponification product of an acid resulting from the oxidation of petroleum wax, water and sodium thiosulphate, the relative proportion of water and thiosulphate being such as to form a soap of gel consistency.

5. A gel soap comprising the saponification product of an acid formed by oxidation of petroleum wax, water and a salt formed by oxidizing a solution consisting mainly of sodium acid sulphide, the relative proportions of water and salt being such as to produce a soap of gel consistency.

6. A gel soap comprising the saponification product of an acid formed by oxidation of petroleum wax, water and a salt formed by oxidizing a solution consisting mainly of sodium acid sulphide and obtained by treatment of sulphur containing petroleum with caustic alkali.

CARLETON ELLIS.